US012440866B2

(12) United States Patent
Sauer et al.

(10) Patent No.: US 12,440,866 B2
(45) Date of Patent: Oct. 14, 2025

(54) DEVICE AND METHOD FOR APPLYING AN AT LEAST TWO-COMPONENT VISCOUS MATERIAL TO WORKPIECES

(71) Applicant: Atlas Copco IAS GmbH, Bretten (DE)

(72) Inventors: Michael Sauer, Bretten (DE); Adrian Jenz, Karlsruhe (DE); Christian Messenbrink, Stutensee (DE)

(73) Assignee: Atlas Copco IAS GmbH, Bretten (DE)

( * ) Notice: Subject to any disclaimer, the term of this patent is extended or adjusted under 35 U.S.C. 154(b) by 144 days.

(21) Appl. No.: 18/291,292

(22) PCT Filed: Jul. 21, 2022

(86) PCT No.: PCT/EP2022/070453
§ 371 (c)(1),
(2) Date: Jan. 23, 2024

(87) PCT Pub. No.: WO2023/011928
PCT Pub. Date: Feb. 9, 2023

(65) Prior Publication Data

US 2024/0359206 A1 Oct. 31, 2024

(30) Foreign Application Priority Data

Aug. 4, 2021 (DE) ..................... 10 2021 120 274.4

(51) Int. Cl.
*B05C 11/10* (2006.01)
*B01F 25/43* (2022.01)
(Continued)

(52) U.S. Cl.
CPC .......... *B05C 11/1036* (2013.01); *B01F 25/43* (2022.01); *B01F 35/7164* (2022.01); *B05C 5/0225* (2013.01)

(58) Field of Classification Search
CPC ............... B05C 11/1036; B05C 5/0225; B01F 35/7164; B01F 25/43
See application file for complete search history.

(56) References Cited

U.S. PATENT DOCUMENTS 7,318,554 B2 * 1/2008 Langeman ............ B05B 7/0093 239/10
11,154,829 B2 10/2021 Pfeiler et al.
(Continued)

FOREIGN PATENT DOCUMENTS

CA 1 304 352 C 6/1992
CN 201415176 Y 3/2010
(Continued)

OTHER PUBLICATIONS

International Search Report in PCT/EP2022/070453, mailed Nov. 17, 2022.
(Continued)

*Primary Examiner* — Jeremy Carroll
(74) *Attorney, Agent, or Firm* — Collard & Roe, P.C.

(57) ABSTRACT

A device for applying an at least two-component viscous material to workpieces, includes a metering unit which has a number of metering valves corresponding to the number of components of the viscous material, and a static mixer which has a mixing tube, for mixing the components introduced using the metering unit into a material inlet at its first end and during passage from the material inlet to a material outlet at its second end, and an outer tube, wherein the mixing tube is received in the outer tube and, at the material inlet and at the material outlet, is sealed off from the environment using respective seals. The seals each have a circumferential cutting edge, and the cutting edges, when subjected to force in a direction towards each other, each cut into an end face on the mixing tube.

18 Claims, 3 Drawing Sheets

Figure 1:
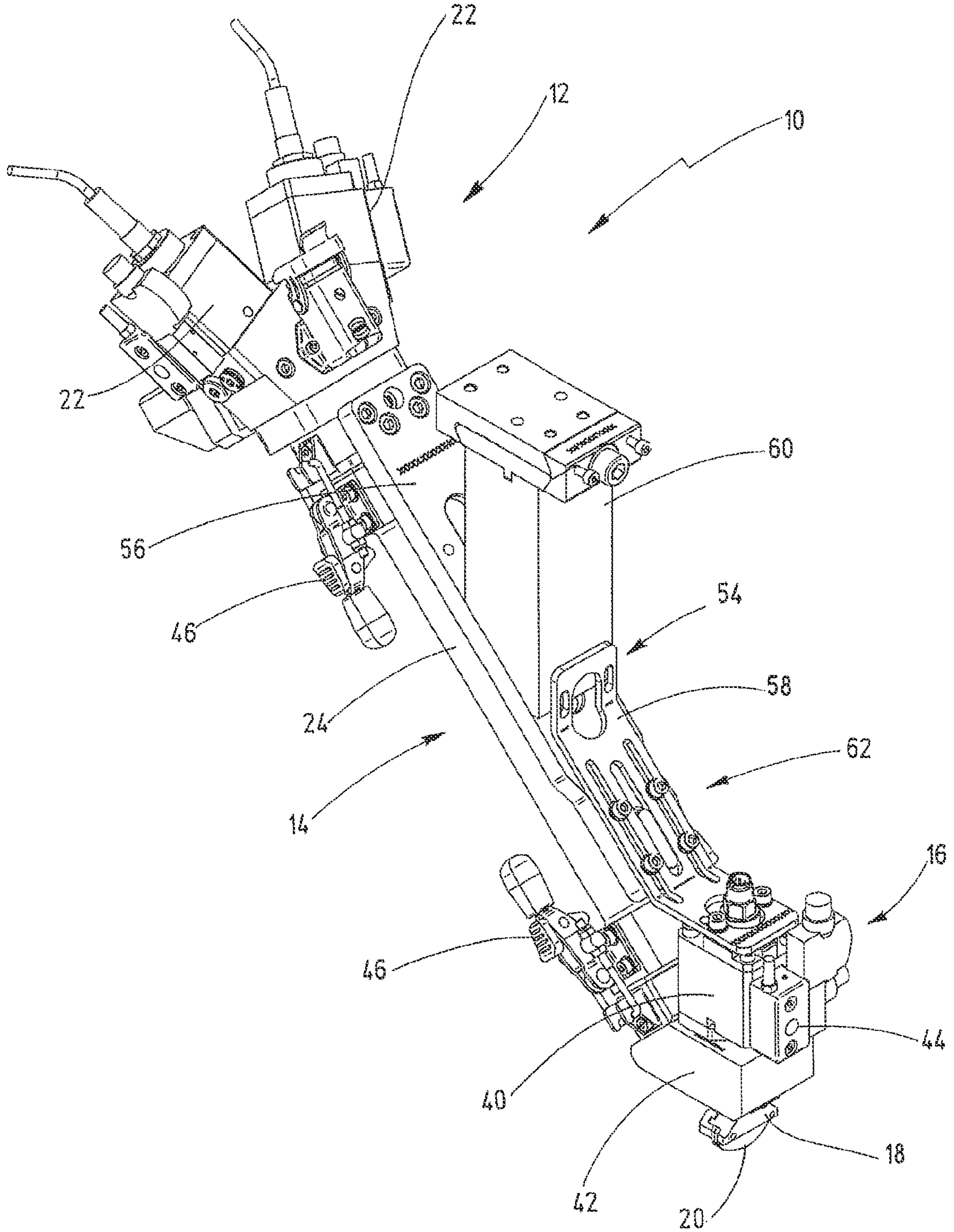

(51) Int. Cl.

| | |
|---|---|
| ***B01F 35/71*** | (2022.01) |
| ***B05C 5/02*** | (2006.01) |

(56) References Cited

U.S. PATENT DOCUMENTS

| | | | |
|---|---|---|---|
| 2005/0103889 A1 | 5/2005 | Langeman | |
| 2008/0110926 A1* | 5/2008 | Cocciadiferro | B29B 7/7678 222/145.5 |
| 2013/0048670 A1* | 2/2013 | Greter | B05C 17/00586 222/137 |
| 2014/0061240 A1 | 3/2014 | Gabrielson et al. | |
| 2014/0197195 A1* | 7/2014 | Peuker | B65D 83/762 222/39 |
| 2015/0174541 A1 | 6/2015 | Koelle et al. | |
| 2017/0259232 A1* | 9/2017 | Vogt | A61B 17/8833 |

FOREIGN PATENT DOCUMENTS

| | | |
|---|---|---|
| CN | 212732815 U | 3/2021 |
| DE | 36 41 548 A1 | 6/1988 |
| EP | 0 313 519 A1 | 4/1989 |
| EP | 3 225 315 A1 | 10/2017 |
| WO | 2004/073848 A1 | 9/2004 |
| WO | 2008/054930 A1 | 5/2008 |
| WO | 2020/154360 A1 | 7/2020 |

OTHER PUBLICATIONS

German Search Report dated Apr. 1, 2022 in German Application No. 10 2021 120 274.4, with English translation of relevant parts.
Notification of Transmittal of Copies of Translation of the International Preliminary Report on Patentability in PCT/EP2022/070453, mailed Feb. 15, 2024, with attached English translation of the International Preliminary Report on Patentability and Written Opinion of the International Searching Authority.

* cited by examiner

DEVICE AND METHOD FOR APPLYING AN AT LEAST TWO-COMPONENT VISCOUS MATERIAL TO WORKPIECES

CROSS REFERENCE TO RELATED APPLICATIONS

This application is the National Stage of PCT/EP2022/070453 filed on Jul. 21, 2022, which claims priority under 35 U.S.C. § 119 of German Application No. 10 2021 120 274.4 filed on Aug. 4, 2021, the disclosure of which is incorporated by reference. The international application under PCT article 21 (2) was not published in English.

The invention relates to an apparatus for applying an at least two-component viscous material to workpieces, in accordance with the preamble of claim 1.

Such apparatuses are used, in particular, in vehicle construction, and serve for producing a viscous material by means of mixing at least two components and applying this material to a workpiece. In particular, such apparatuses are used when applying two-component adhesives. A further field of application, which has gained importance in recent times, is the application of fire protection compounds to battery housings of electric vehicles. Such fire protection compounds are currently only available as at least two-component materials. Known apparatuses of this type have a metering unit through which a number of material feed channels that corresponds to the number of components of the viscous material extend. Each of the material feed channels can be blocked off and released by means of a metering valve, so as to be able to meter each component precisely. One of the components is introduced into a static mixer through each of the material feed channels, in a metered manner, in which mixer the components are mixed, forming the viscous material. The static mixer has a mixing tube in which generally a mixing spiral is arranged, and which tube has a material inlet at its first end and a material outlet at its second end. The mixing tube is accommodated in a stable outer tube, which supports the mixing tube when great material pressures are applied. The material outlet is followed by an application nozzle for dispensing the viscous material, which nozzle has an application opening from which the material is dispensed.

Such apparatuses have been successfully used for many years for applying two-component or multi-component materials to workpieces. However, the criticism is occasionally expressed that in some applications, viscous material penetrates between the mixing tube and the outer tube, and thereby replacement of the mixing tube is made difficult. Furthermore, the criticism is occasionally expressed that the beginning and/or the end of an application track of the viscous material cannot be defined with sufficient precision in terms of shape and/or size.

It is therefore the task of the invention to further develop an apparatus of the type stated initially, in such a manner that the seal at the material inlet and at the material outlet is improved.

This task is accomplished, according to the invention, by means of an apparatus having the characteristics of claim 1. Advantageous further developments of the invention are the object of the dependent claims.

The invention proceeds from the fundamental idea that the mixing tubes that are used in such an apparatus can only be used for a few hours, in any case, before they become clogged with hardening material. The mixing tube then has to be replaced, wherein the mixing tube that has become clogged with hardened material is disposed of. Such a disposable article is therefore generally produced from plastic and cannot withstand high pressures. For this reason, the mixing tube is accommodated in a stable outer tube, which is preferably produced from metal. The outer tube, against the inner surface of which the mixing tube preferably lies over its entire length, in particular in the case of pressure-impacted introduction of the components, supports the mixing tube when high material pressures are applied. The mixing tube is preferably accommodated in the outer tube loosely or releasably, so that it can be removed from the outer tube and passed on to disposal, while the outer tube can be used again. It is advantageous if the mixing tube is inserted into the outer tube with some play, so as to be able to insert it easily and remove it easily again. Typically, its outside diameter is a few tenths of a millimeter smaller than the inside diameter of the outer tube. It then lies against the inner surface of the outer tube with its mantle surface as the result of elastic expansion, when the pressure in its interior increases to several bar, for example approximately five bar. According to the invention, by means of the seal by means of circumferential cutting edges, the problem is taken into account that in the event of insufficient sealing, viscous material or its components can exit into the environment at the material inlet or at the material outlet and penetrate between the mixing tube and the outer tube, so that the two tubes can no longer be separated from one another. The invention is therefore based on the idea that the cutting edges cut into an end face, in each instance, of the mixing tube, which is regularly produced from soft plastic, and thereby form an excellent seal. Since the mixing tube is a disposable article, its damage caused by the cutting edges is not relevant.

It is advantageous if a first one of the two cutting edges is connected to the metering unit, while the second one of the two cutting edges is connected to an end piece that has the material outlet channel. In this regard, the end piece can have the application nozzle, the outlet valve, and further components, if applicable. Furthermore, it is preferred that the metering unit and the end piece are releasably connected to the outer tube, by means of a quick-release mechanism. A quick-release mechanism makes it possible to exert a great force, so that the cutting edges can cut into the end faces. Furthermore, it makes quick release of the connection possible when the mixing tube is supposed to be replaced.

According to an advantageous further development, the metering unit and the end piece are releasably connected to one another by means of a connection device. It is practical if the connection device has a first connection part connected to the metering unit and a second connection part connected to the end piece, wherein the first and the second connection part are longitudinally displaceable relative to one another by means of a guide device. This allows better positioning of the components relative to one another, so that in the event of a mixer change, pre-centering of the components relative to one another takes place. It is practical if the guide device has an end stop that defines an end position of the end piece with reference to the metering unit, in which position the cutting edges cut into the end faces on the mixing tube. It is practical if the end position is reached or almost reached when the quick-release mechanism is tightened. This measure facilitates assembly, because it ensures that a sufficient seal is achieved by means of cutting of the cutting edges into the end faces of the mixing tube, when the end piece is in the end position relative to the metering unit or approaches this position. It is advantageous if the guide device has a further end stop that defines a further end position of the end piece relative to the metering unit, in which position the cutting edges are arranged at a distance from one another that is greater than the reciprocal distance of the end faces on the mixing tube. Release of the connection between the metering unit and the outer tube as well as between the end piece and the outer tube then makes it possible for the end piece to move into the further end position relative to the metering unit, but it continues to be connected to the latter and does not have to be put aside, and thereby assembly is facilitated, once again.

According to an advantageous further development of the invention, each metering valve has a material feed channel assigned to it, which channel can be blocked and released by means of the metering valve in question; the material feed channels open into the material inlet, and the apparatus has an application nozzle that is connected to the material outlet and has an application opening for dispensing the viscous material, and an outlet valve for blocking and releasing a material outlet channel that extends from the material outlet to the application opening. This further development is based on the idea of being able to block the material outlet channel, using the outlet valve, for such a long time until a sufficient pre-pressure of the viscous material has built up in it, so that more precise material application is made possible. Furthermore, the material application can be ended, in a targeted manner, by means of blocking the material outlet channel using the outlet valve, without material residues exiting from the application opening in a non-definable amount or form. For this purpose, it is advantageous if a control device is provided, which turns on the outlet valve for blocking and releasing the material outlet channel. It is practical if a pressure sensor for measuring the pressure of the viscous material in the material outlet channel is provided. By means of the pressure measurement in the material outlet channel, a pre-pressure of the viscous material that is present ahead of the outlet valve can be built up in a targeted manner. The control device can then control the outlet valve as a function of the pressure measured by the pressure sensor. However, it is also possible that the control device turns on the outlet valve as a function of the control of the metering valves. In particular, it can be provided that the outlet valve is opened for release of the material outlet channel only when the pressure measured by the pressure sensor reaches or exceeds a reference value. Alternatively or supplementally, it can be provided that the control device turns on the outlet valve for release of the material outlet channel with a predetermined time delay after release of the material feed channels by means of the metering valves. A method in which the outlet valve is opened, at the earliest, with a predefined time span after opening of the metering valves, but fundamentally only when a predetermined pre-pressure is measured in the material outlet channel, is particularly preferred. In order to keep the pressure of the viscous material constant until the end of the material application, it is preferred that the control device, toward the end of the material application, first turns on the outlet valve for blocking the material outlet channel and then turns on the metering valves for blocking the material feed channels, or turns on the outlet valve and the metering valves at the same time.

Figures 2A, 2B, 2C:
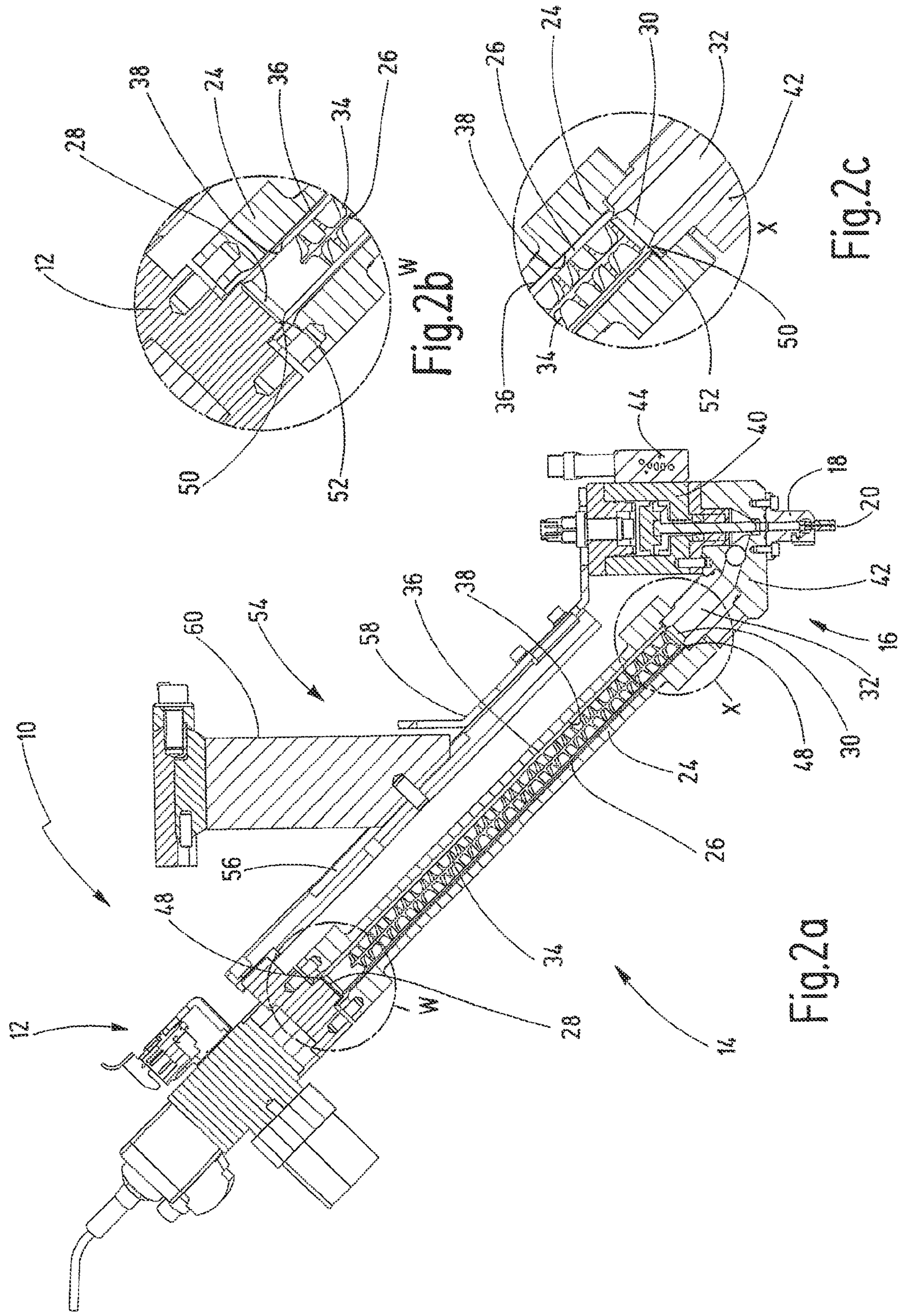
Figure 3:
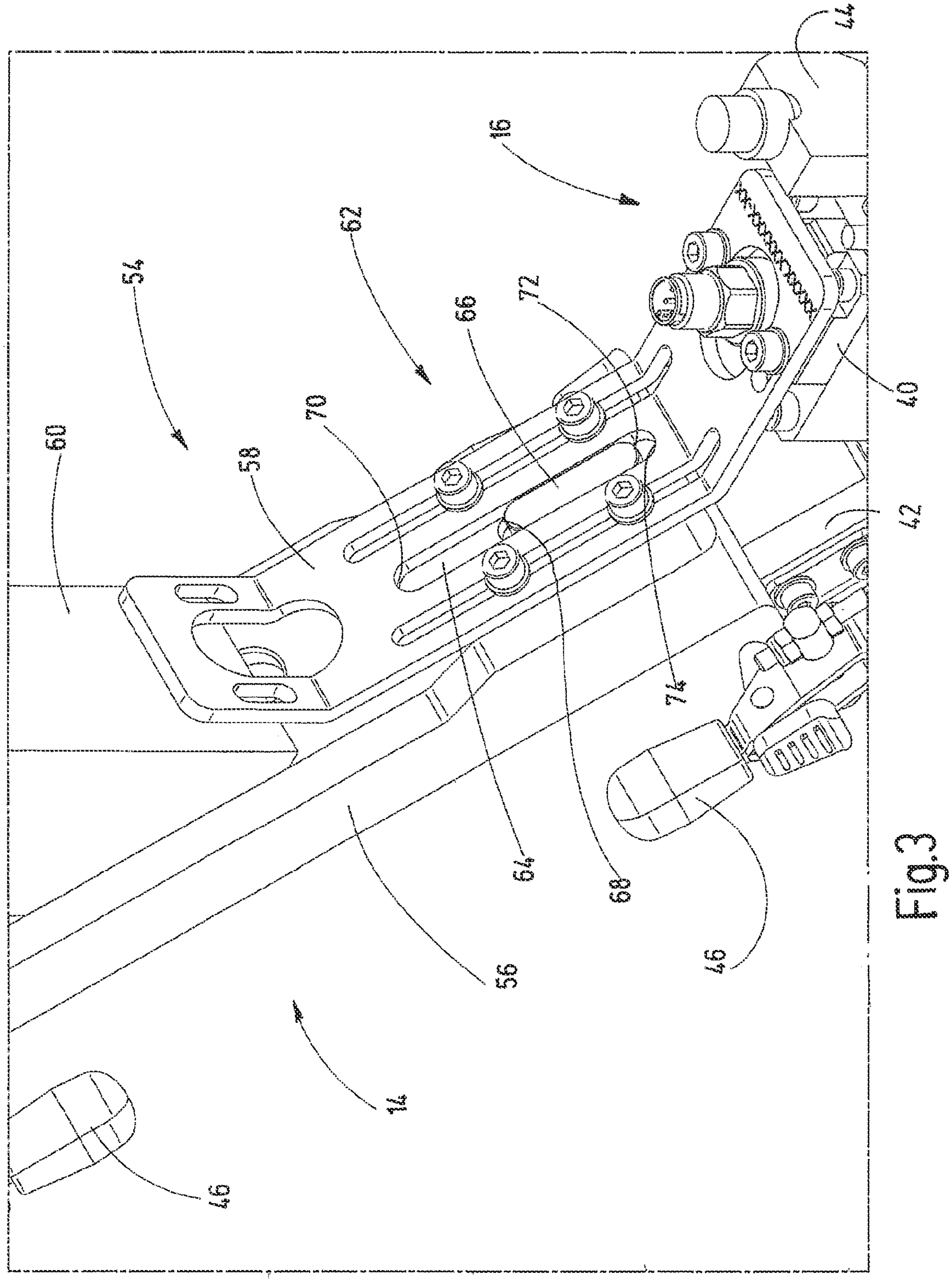

In the following, the invention will be explained in greater detail using an exemplary embodiment shown schematically in the drawing. The drawing shows:

FIG. 1 an apparatus for applying a two-component viscous material to workpieces, in a perspective representation;

FIG. 2*a* to *c* the apparatus according to FIG. 1 in a longitudinal section, as well as detail representations W and X, and FIG. 3 a detail representation of the apparatus according to FIG. 1.

The apparatus 10 shown in the drawing serves for application of a two-component viscous material to workpieces, in particular application of a two-component fire-protection compound to battery housings of electric vehicles. It has a metering unit 12 as well as a static mixer 14, into which the two components are introduced while being metered and having pressure applied to them, and which mixer is followed by an end piece 16, which has an application nozzle 18 having an application opening 20, from which the viscous material exits and is applied to the workpieces.

Material feed channels, not shown in any detail in the drawing, extend through the metering unit 12, wherein a material feed channel is provided for each of the two components. The metering unit 12 furthermore has two metering valves 22, configured as needle valves, wherein each is assigned to one of the material feed channels and serves for blocking this channel or for releasing it to allow the component in question to pass through. The static mixer 14 has an outer tube 24 composed of metal and a mixing tube 26, composed of plastic, held in the outer tube 24, which mixing tube has a material inlet 28 on its first end, facing the metering unit 12, into which inlet the material feed channels open. These can open directly into the material inlet 28 or be brought together before opening into a central feed channel, which in turn opens into the material inlet 28. On its second end, which faces away from the first end and faces the end piece 16, the mixing tube 26 has a material outlet 30, which opens into a material outlet channel 32 that runs through the end piece 26 all the way to the application opening 20. In order to mix the components better to produce the viscous material, a mixing spiral 34 is arranged in the interior of the mixing tube 26. The mixing tube 26 is accommodated in the outer tube 24 with slight play, and, as soon as the pressure in its interior reaches several bar, lies against an inner surface 38 of the outer tube 24 with its mantle surface 36, over its entire length, as the result of elastic expansion, so that it is supported on the outer tube 24, so as to be able to withstand even higher pressures of the material situated in it.

The end piece 16 has an outlet valve 40 configured as a needle valve, which serves for releasing or blocking the material outlet channel 32. It furthermore has a basic body 42 that follows the static mixer 14, which body carries the application nozzle 18 and on which the outlet valve 40 is installed. The end piece 16 furthermore has a pressure sensor 44 with which the prevailing pressure of the viscous material in the material outlet channel 32 is measured. The pressure measurement values determined by the pressure sensor 44 are transmitted to a control device, not shown in any detail in the drawing.

The metering unit 12 and the end piece 16 are connected to the static mixture by means of a quick-release mechanism 46, in each instance, so that rapid replacement of the static mixer 14 is made possible. As soon as the mixing tube 26 has become clogged with hardening or hardened material, to an extent that can no longer be tolerated, the two quick-release mechanisms 46 are loosened and the static mixer 14 is replaced with a new static mixer. The mixing tube 26, which has become clogged with the material, is then removed from the outer tube 24 and disposed of, while the outer tube 24 is fitted with a new mixing tube, thereby forming a new static mixer. In order to prevent exiting of the viscous material or its components into the environment at the transitions from the metering unit 12 to the static mixer 14 as well as from the static mixer 14 to the end piece 16, seals 48 are arranged there, in each instance. These have a circumferential cutting edge 50, circular in a top view, in each instance, wherein one cutting edge 50 is attached to the metering unit 12 and to the end piece 16, in each instance. By means of the quick-release mechanisms 46, the static mixer 14 is clamped in place between the metering unit 12 and the end piece 16 in such a manner that the cutting edges 50 cut into an end face 52 of the mixing tube 26, in each instance, under the effect of force, and bring about a good seal at the material inlet 28 and at the material outlet 30, with regard to the environment.

The apparatus 10 furthermore has a connection device 54 that connects the metering unit 12 and the end piece 16 to one another, which device has a first connection part 56 mounted on the metering unit 12 and a second connection part 58 mounted on the end piece 16. A connector piece 60 connected to the first connection part 56 serves for installation of the apparatus 10 on a robot arm. The connection device 54 furthermore has a guide device 62, which allows restricted displacement of the connection parts 56, 58. The guide device 62 has an oblong hole 64 in the second connection part 58 as well as an elongated elevation 66 on the first connection part 56, which elevation engages into the oblong hole 64. Contact of a first end 68 of the elevation, which end faces the metering unit 12, with a first end 70 of the oblong hole 64, which end faces the former end, defines an end stop that is characterized in that the cutting edges 50 are arranged at a distance from one another that is less than the reciprocal distance between the end faces 52, so that they cut into the end faces 52. A further end stop is defined by the second end 72 of the elevation 66, which end faces away from the metering unit 12, and the second end 74 of the oblong hole 64, which faces the former end. If the two connection parts 56, 58 are in the position defined by the further end stop, then the cutting edges 50 are arranged at a reciprocal distance from one another that is greater than the reciprocal distance between the end faces 52, so that the sealing effect is canceled out and the static mixer 14 can be taken out between the metering unit 12 and the end piece 16. Replacement of the static mixer 14 is then possible, without releasing the connection between the metering unit 12 and the end piece 16. These remain connected to one another by means of the connection device 54.

To apply the viscous material to workpieces, first the metering valves 22 are opened, so that the components are introduced into the static mixer 14 in a metered manner and with pressure applied to them. In general, a pre-pressure is built up ahead of the metering valves 22 before these are opened. Opening of the outlet valve 40 then takes place when a sufficient pre-pressure has been built up in the material outlet channel 32, ahead of the outlet valve 40. This is generally the case a short time after opening of the metering valves 22, so that the control device can turn on the outlet valve 40 to open, with a time delay after the metering valves 22. Furthermore, the pressure that prevails in the material outlet channel 32 can be measured by means of the pressure sensor 44. The measured pressure is then transmitted to the control device, which checks whether the measured pressure at least reaches a predetermined reference value. If this is the case, then the outlet valve 40 is opened at the predetermined time point after the metering valves 22 are opened. If this is not the case, the outlet valve 40 still remains closed until the pressure measured by the pressure sensor 44 reaches the reference value. However, it is also possible to leave the pressure sensor 44 out and to open the outlet valve 40 exclusively by way of the predetermined time delay after the metering valves 22. After the end of the application process, the outlet valve 40 is closed and thereby the material outlet channel 32 is blocked. At the same time or with a short delay, the metering valves 22 are then closed, and the material feed channels are blocked.

In summary, the following should be stated: The invention relates to an apparatus 10 for applying an at least two-component viscous material to workpieces, having a metering unit 12 that has a number of metering valves 22 that corresponds to the number of components of the viscous material, and having a static mixer 14 that has a mixing tube 26 for mixing the components as they are passed through from a material inlet 28 at its first end to a material outlet 30 at its second end, wherein each metering valve 22 has a material feed channel assigned to it, which channel can be blocked and released by means of the metering valve 22 in question, and wherein the material feed channels open into the material inlet 28, and having an application nozzle 18 connected to the material outlet 30, which nozzle has an application opening 20 for dispensing the viscous material. According to the invention, an outlet valve 40 for blocking and releasing a material outlet channel 32 that extends from the material outlet 30 to the application opening 20 is provided.

The invention claimed is:

1. An apparatus for applying an at least two-component viscous material to workpieces, having a metering unit (12) that has a number of metering valves (22) that corresponds to the number of components of the viscous material, and having a static mixer (14) that has a mixing tube (26) for mixing the components, which are introduced, by means of the metering unit (12), into a material inlet (28) at its first end, passing through from the material inlet (28) to a material outlet (30) at its second end, and an outer tube (24), wherein the mixing tube (26) is accommodated in the outer tube (24), and sealed off, relative to the environment, at the material inlet (28) and the material outlet (30), in each instance, by means of a seal (48), wherein the seals (48) have a circumferential cutting edge (50), in each instance, and wherein the cutting edges (50), when subjected to a force toward one another, cut into an end face (52) on the mixing tube (26), in each instance.

2. The apparatus according to claim 1, wherein a first one of the two cutting edges (50) is connected to the metering unit (12), and wherein the second one of the two cutting edges (50) is connected to an end piece (16) that has the material outlet channel (32).

3. The apparatus according to claim 2, wherein the metering unit (12) and the end piece (16) are releasably connected, by means of a quick-release mechanism (46), to the outer tube (24), in each instance.

4. The apparatus according to claim 2, wherein the metering unit (12) and the end piece (16) are releasably connected to one another by means of a connection device (54).

5. The apparatus according to claim 4, wherein the connection device (54) has a first connection part (56) connected to the metering unit (12) and a second connection part (58) connected to the end piece (16), wherein the first and the second connection part (56, 58) are longitudinally displaceable relative to one another by means of a guide device (62).

6. The apparatus according to claim 5, wherein the guide device (62) has an end stop that defines an end position of the end piece (16) relative to the metering device (12), in which position the cutting edges (50) cut into the end faces (52) on the mixing tube (26).

7. The apparatus according to claim 6, wherein the guide device (62) has a further end stop that defines a further end position of the end piece (16) relative to the metering unit (12), in which position the cutting edges (50) are arranged at a distance from one another that is greater than the reciprocal distance between the end faces (52) on the mixing tube (26).

8. The apparatus according to claim 1, wherein the mixing tube (26) lies against an inner surface (38) of the outer tube (24) with its mantle surface (36), in particular when the components are introduced into the mixing tube (26) under pressure, and preferably over its entire length.

9. The apparatus according to claim 1, wherein the mixing tube (26) is loosely or releasably accommodated in the outer tube (24).

10. The apparatus according to claim 1, wherein the outer tube (24) is produced from metal.

11. The apparatus according to claim 1, wherein each metering valve (22) has a material feed channel assigned to it, which channel can be blocked and released by means of the metering valve (22) in question, wherein the material feed channels open into the material inlet (28), and wherein the apparatus has an application nozzle (18) that is connected to the material outlet (30) and has an application opening (20) for dispensing the viscous material, and an outlet valve (40) for blocking and releasing a material outlet channel (32) that extends from the material outlet (30) to the application opening (20).

12. The apparatus according to claim 11, further comprising a pressure sensor (44) for measuring the pressure of the viscous material in the material outlet channel (32).

13. The apparatus according to claim 11, further comprising a control device for controlling the outlet valve (40) as a function of the control of the metering valves (22) and/or as a function of the pressure measured by the pressure sensor (44).

14. A method for applying an at least two-component viscous material to workpieces by means of the apparatus (10) according to claim 1, wherein each of the components is supplied, under pressure, by way of a material feed channel to a metering unit (12), which has a number of metering valves (22) that corresponds to the number of components of the viscous material, for releasing and blocking one of the material feed channels, in each instance, wherein the components are introduced into a material inlet (28) of a mixing tube (26) of a static mixer (14) by means of the metering unit (12), in a metered manner, wherein the components are mixed in the static mixer (14) to produce the viscous material, which is passed out of a material outlet (30) of the mixing tube (26) into a material outlet channel (32) that extends to an application opening (20) of an application nozzle (18), and wherein an outlet valve (40) for blocking and releasing the material outlet channel (32) is controlled by means of a control device.

15. The method according to claim 14, wherein the pressure of the viscous material in the material outlet channel (32), upstream from the outlet valve (40), is measured by means of a pressure sensor (44), wherein the pressure measurement values are transmitted to the control device, and wherein the control device turns the outlet valve (40) on as a function of the pressure measurement values.

16. The method according to claim 15, wherein the outlet valve (40) for release of the material outlet channel (32) is only opened when the pressure measured by the pressure sensor reaches or exceeds a reference value.

17. The method according to claim 14, wherein the control device turns the outlet valve (40) on for release of the material outlet channel (32) with a predetermined time delay after release of the material feed channels by the metering valves (22).

18. The method according to claim 14, wherein the control device, at the end of a material application, first turns on the outlet valve (40) to block the material outlet channel, and then turns on the metering valves (22) for blocking the material feed channels, or turns on the outlet valve (40) and the metering valves (22) at the same time.

* * * * *